Aug. 10, 1965  C. KASPARIAN  3,200,285
MOTOR CONTROL
Filed Aug. 31, 1961  4 Sheets-Sheet 1
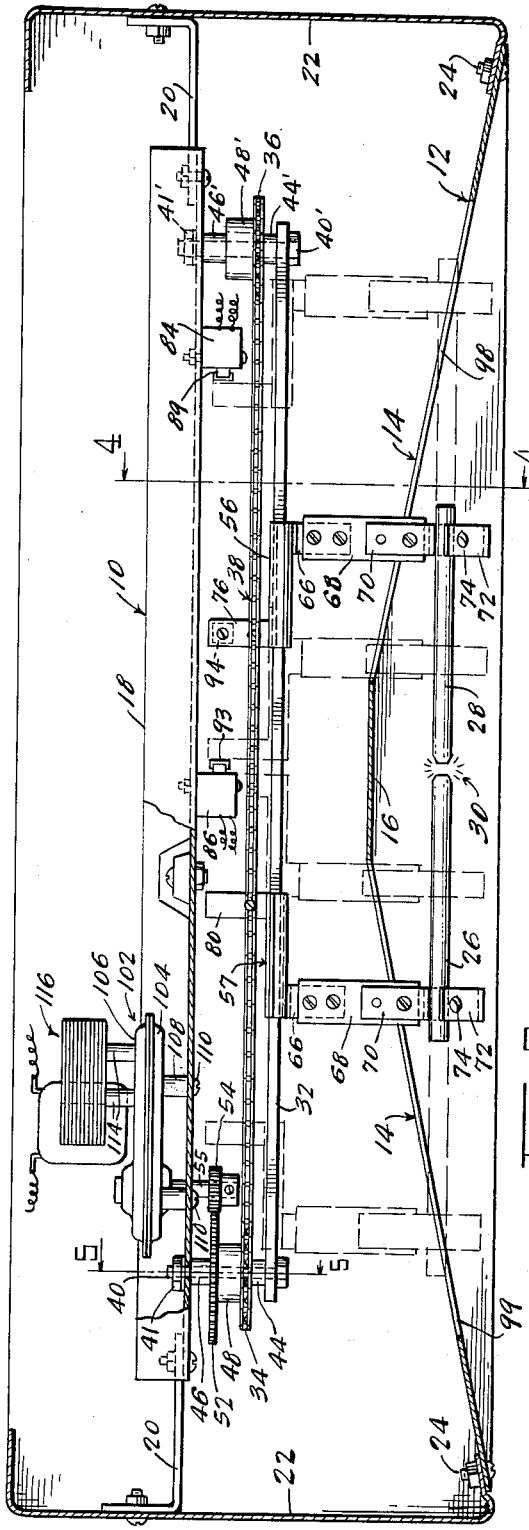
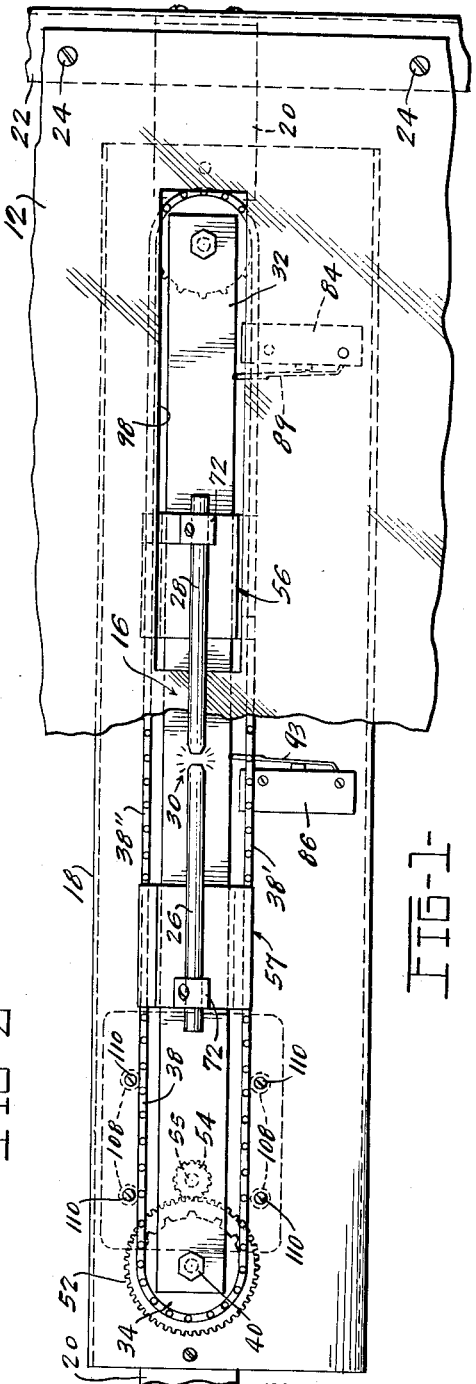
INVENTOR:
CASPER KASPARIAN.
BY
Harry O. Ernsberger
ATTORNEY Aug. 10, 1965
C. KASPARIAN
3,200,285
MOTOR CONTROL
Filed Aug. 31, 1961
4 Sheets-Sheet 2
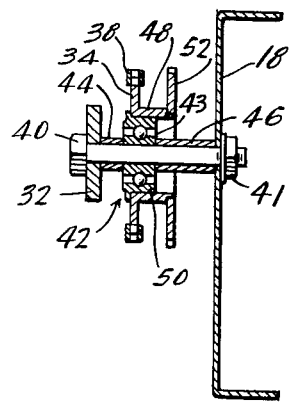
FIG-5-
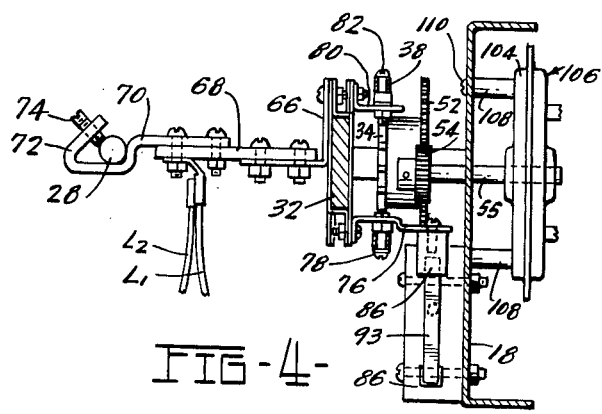
FIG-4-
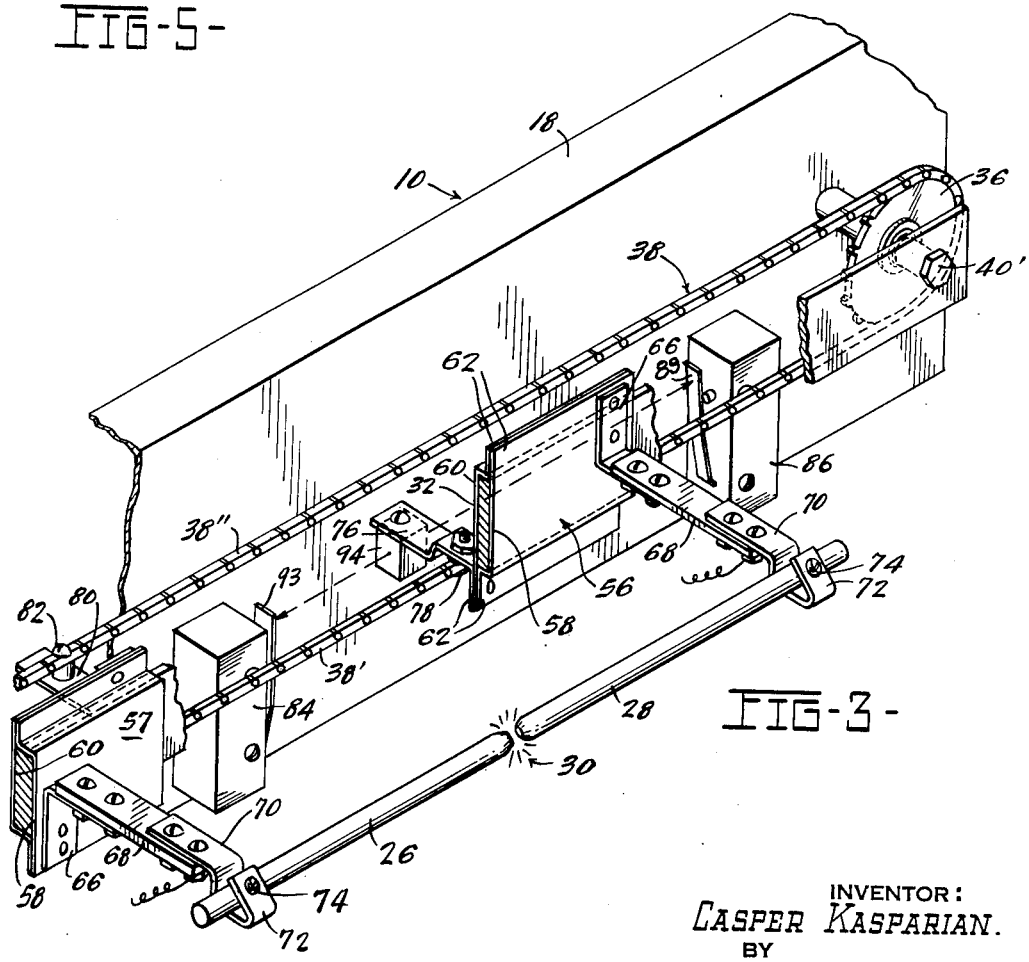
FIG-3-
INVENTOR:
CASPER KASPARIAN.
BY
Harry O. Ernsberger
ATTORNEY Aug. 10, 1965     C. KASPARIAN     3,200,285
MOTOR CONTROL
Filed Aug. 31, 1961     4 Sheets-Sheet 3
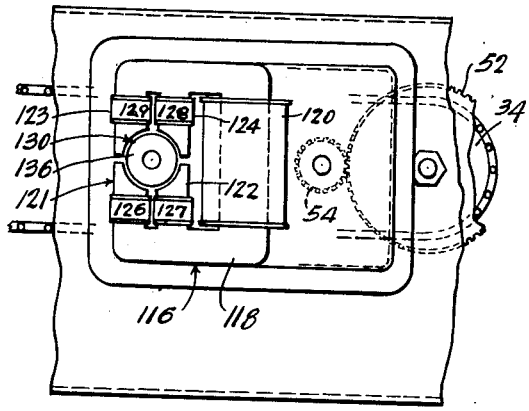
FIG-6-
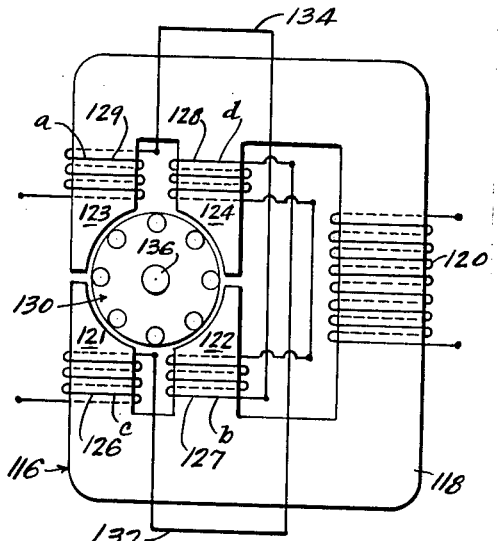
FIG-7-
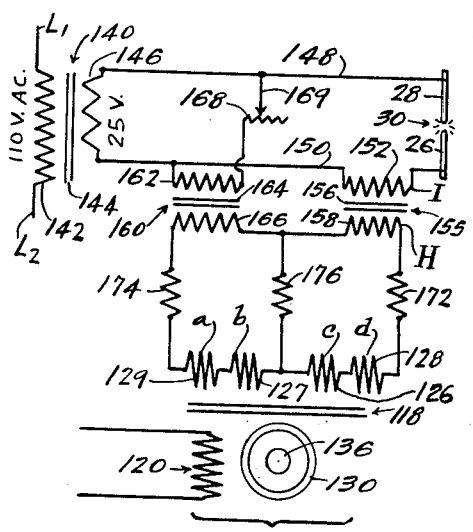
FIG-8-
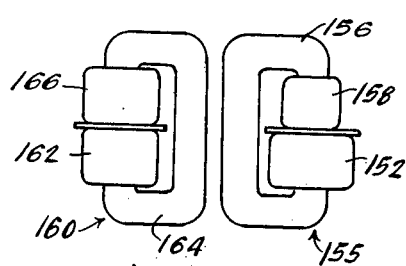
FIG-11-
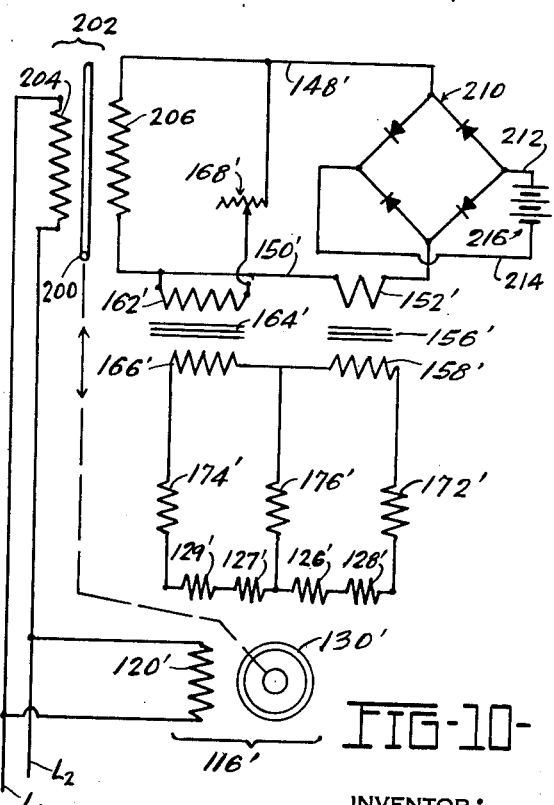
FIG-10-
INVENTOR:
CASPER KASPARIAN.
BY
Harry O. Ernsberger
ATTORNEY

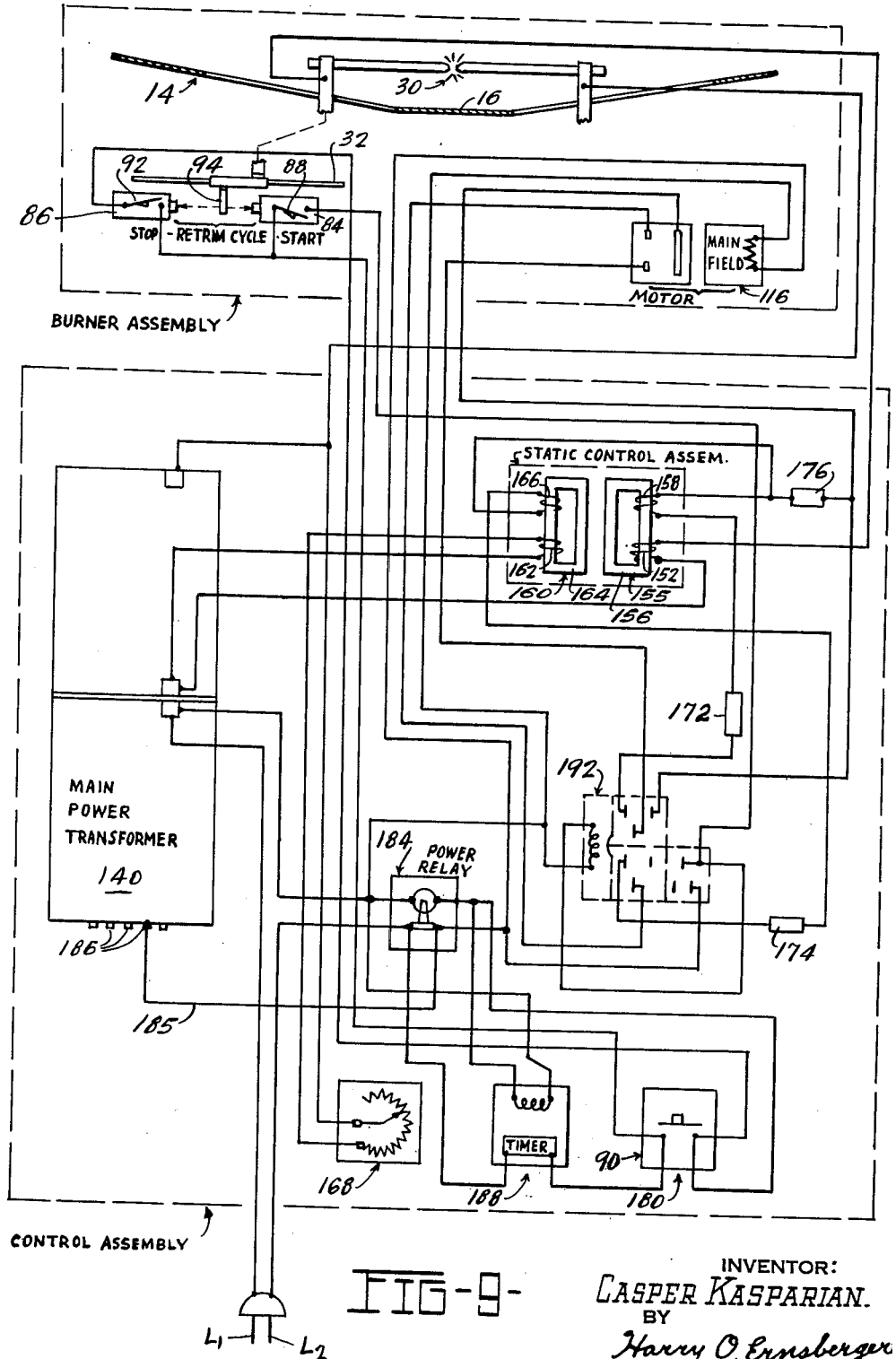

3,200,285
MOTOR CONTROL
Casper Kasparian, Toledo, Ohio, assignor to The Strong Electric Corporation, Toledo, Ohio, a corporation of Delaware
Filed Aug. 31, 1961, Ser. No. 135,371
15 Claims. (Cl. 314—68)

This invention relates to controls for electrically energizing motors and more especially to a control arrangement for a reversible shaded pole motor usable for various purposes.

Heretofore it has been a practice to control the starting and operation of a reversible shaded pole motor through the use of switch means or a relay controlled means to initiate operation of such motors and for energizing the shading coils in a manner to control the direction of rotation of the motor armature. Control devices heretofore used for the purpose usually include relatively movable armatures or switch arms for engaging and disengaging contacts for controlling the circuits. Movable contacts and armatures are subject to wear and deterioration which eventually impair the proper functioning of the control means. Furthermore such control devices embodying armatures or movable members which may be spring biased to operative or nonoperative positions require substantial current or voltage change in order to initiate reverse rotation of the motor armature.

In arc lamp constructions, it is a conventional practice to utilize reversible motor means for moving the electrodes, employed for establishing an arc, to maintain substantially constant the arc. The current and voltage in the arc circuit varies with the size of the arc gap or space between the electrodes and such factors have been heretofore employed for operating movable armatures or relays to affect operation of a motive means to restore the electrodes or carbons to a position to maintain proper arc characteristics. Such control devices are subject to difficulties and deficiencies such as excessive wear or deterioration of contacts, the inertia of moving components and the provision of electromotive forces sufficient to overcome biasing springs or the friction of moving armature or relay components. Such factors impair the accuracy of control of the arc characteristics.

It is highly essential in graphic art reproduction operations to employ an arc lamp for illumination in which the arc may be quickly established and the arc characteristics maintained substantially constant in order to provide constant high-intensity illumination. Controls for the electrode moving motor of the character above-mentioned have been employed for the purpose but deviations and variations in arc characteristics have been encountered by reason of the use of motor controlling devices embodying movable armatures, contacts or relay mechanisms.

The present invention embraces the provision of a method and means for initiating the operation of a shaded pole motor wherein moving mechanical components such as armatures, contacts and springs are eliminated and improved efficiency of motor operation attained.

An object of the invention is the provision of a method and means for mainaining substantially constant the current flow through an electric circuit which is subject to current variations, the control embodying a static control arrangement associated with the main circuit whereby current variations in the main circuit establishes electromotive forces utilized to restore the normal current flow characteristics in the main circuit.

Another object of the invention resides in a method and means of control of current flow through a main circuit dependent for its constancy upon the operation of a reversible shaded pole motor wherein varaitions in current flow in the main circuit set up an imbalance condition in secondary control circuit means associated with the shading poles of the motor whereby the direction and extent of rotation of the motor automatically restores normal current flow characteristics through the main circuit.

Another object of the invention resides in a static control system for a reversible shaded pole motor operatively associated with a primary circuit subject to current variations wherein current variations establish an imbalance condition in a static control circuit arrangement to initiate operation of the motor to restore normal current flow characteristics through the primary circuit.

Still another object of the invention is the provision of a static control system associated with an arc current circuit wherein a reversible shaded pole motor is employed for positioning the electrodes producing the arc, the current variations in the arc circuit being effective through secondary circuits intercalated with the shading poles of the motor to effect shift of the magnetic flux in the shaded pole system whereby automatic control of the direction of rotation and the extent of rotation of the motor is initiated without the utilization of moving parts or components.

Still a further object of the invention is the provision of a static control system for maintaining substantially constant the current flow through an arc circuit wherein a reversible shaded pole motor is operable for moving the electrodes by flux variations in the shading poles of the motor set up by current variations in the arc circuit whereby reestablishment of the normal current flow through the arc circuit automatically restores balance of electromotive forces in the pole circuits and cessation of operation of the motor.

Further objects and advantages are within the scope of this invention such as relate to the arrangement, operation and function of the related elements of the structure, to various details of construction and to combinations of parts, elements per se, and to economics of manufacture and numerous other features as will be apparent from a consideration of the specification and drawing of a form of the invention, which may be preferred, in which:

FIGURE 1 is a front elevational view of a portion of an arc lamp embodying movable electrodes for establishing the arc which are controlled by the system of the invention;

FIGURE 2 is a top plan view of the arrangement shown in FIGURE 1, with certain parts shown in section;

FIGURE 3 is an isometric view illustrating the means for supporting and actuating the electrodes of the lamp;

FIGURE 4 is a transverse sectional view taken substantially on the line 4—4 of FIGURE 2;

FIGURE 5 is a sectional view taken substantially on the line 5—5 of FIGURE 2;

FIGURE 6 is an elevational view of shaded pole motor for actuating the electrode supporting means;

FIGURE 7 is a semi-schematic view of the shaded pole circuits of the motor illustrated in FIGURE 6;

FIGURE 8 is a schematic circuit diagram of the static control system of the invention;

FIGURE 9 illustrates the cirucits of the components of the arc lamp;

FIGURE 10 is a schematic diagram illustrating the control system of the invention utilized with a storage battery charging circuit, and FIGURE 11 is an elevational view of one form of static control unit of the invention.

While the motor control arrangement and system of the invention has particular utility for controlling or adjusting the electrodes of an arc circuit to maintain substantially constant an arc between the electrodes, it is to be understood that the control system may be employed for other purposes wherever a shaded pole motor is utilized for stabilizing or maintaining electrical characteristics of a circuit.

The arrangement of the invention, having particular utility for controlling or adjusting the electrodes of an arc lamp, is illustrated in association with an arc lamp, the components of which are illustrated in FIGURES 1 through 5. The arc lamp illustrated has particular utility in the graphic arts field and is inclusive of a frame structure 10 which is mounted upon suitable pedestals (not shown). The lamp includes a reflector 12 which is preferably of rectangular shape elongated in a horizontal direction and includes convergingly arranged planar reflecting portions 14 joined at the region of the arc by a planar portion 16, shown in FIGURE 2.

The frame 10 is inclusive of a horizontally disposed channel-shaped bar or member 18 to the ends of which are secured L-shaped brackets 20. Each of the brackets 20 is connected to a member 22 providing mounting means for the reflector 12, the reflector being secured to the mounting members 22 by screws 24 as shown in FIGURES 1 and 2. In the lamp construction illustrated in FIGURES 1 and 2, the electrodes 26 and 28 are arranged for movement in horizontal directions and are supported or mounted by suitable carriages or carriage means adapted to be moved so as to maintain a gap 30 between the tips of the electrodes in which the arc is formed.

Extending lengthwise of and substantially parallel with the frame member 18 is a bar or member 32 which forms a track or way upon which the electrodes supporting carriage means 56 and 57 are mounted for slidable movement along the bar 32. Each end region of the bar 32 is supported by means illustrated in FIGURE 5. The supporting means for the bar 32 also provides journal means for sprockets 34 and 36 engaged by a chain 38 for driving the electrode carriage supporting means. With particular reference to FIGURE 5, it will be seen that a bolt 40 extends through openings in the bar 32 and the frame member 18.

Mounted upon the bolt 40 is a ball bearing construction 42, the inner race 43 of the bearing 42 being spaced from the bar 32 by a spacer or collar 44, and is spaced from the frame member 18 by a spacer or sleeve 46. The sprocket 34 is fashioned with a hub portion 48 supported upon the outer race 50 of the ball bearing 42. A nut 41 threaded upon the end of the bolt 40 maintains the spacers 44, 46 and bearing race 43 in assembled relation, the bolt also supporting the bar 32 in the manner shown in FIGURE 5.

The hub portion 48 of the sprocket 34 is provided with a spur gear 52 which is driven by a spur gear 54, as shown in FIGURES 1 and 2. The support for the sprocket 36, adjacent the opposite end of the bar 32, is of the same character illustrated in FIGURE 5 wherein the bolt 40' extends through an opening in bar 32, a spacing collar 44', through a ball bearing construction and through a second spacing collar 46 and is provided with a securing nut 41' for securing these components in fixed relation supporting the bar 32.

The sprocket 36 is of similar construction to the sprocket 34 but without a spur gear. Each of the electrode supporting carriages 56 and 57 is inclusive of a pair of plates 58 and 60 which, when mated or assembled as shown in FIGURE 3 provide a rectangular passage between the plates accommodating the bar 32, the carriages 56 and 57 being slidable along the bar. The pairs of flanges 62 of the plates 58 and 60 of each carriage are welded or otherwise secured together. Secured to each of the carriages 56 and 57 is an L-shaped bracket 66 extending forwardly of the carriage.

Secured to each bracket 66 is an extension or member 68 and secured to the outer end regions of the bars or members 68 are electrode supporting clips 70. An upwardly extending portion 72 of each of the electrode supports or clips 70 embraces an electrode, each portion 72 being bored and threaded to accommodate a screw 74 which may be drawn up to securely retain the electrode in the clip.

The carriage 56 carrying the electrode 28 is adapted to be connected to the lower flight 38' of the chain 38. Secured to the mating flanges 62 of the carriage 56 is a rearwardly extending bracket 76 equipped with a bolt 78 which secures the bracket to one of the links of the flight 38' of the chain 38 whereby movement of the chain effects movement of the carriage 56. The carriage 57 supporting the electrode 26 is equipped with a bracket 80 provided with a bolt 82 which secures the bracket to a link of the upper flight 38" of the chain 38 to establish the connection between the carriage 57 and the chain whereby the carriage 57 is movable with the chain.

Through the arrangement of connecting one carriage 56 with the lower flight 38' of the chain, and connecting the other carriage 57 with the upper flight 38" of the chain, movement of the chain by rotation of the sprocket 34 effects corresponding movement of the carriages in opposite directions either toward or away from one another depending upon the direction of movement of the chain 38.

The arrangement is inclusive of switch means for limiting the movement of the electrode supporting carriages in both directions. Secured to the frame member 18 are housings 84 and 86. Housing 84 contains switch means 88, shown in FIGURE 9, for preventing further electrode consumption when, in conjunction with relay 192, the sensing circuit is rendered ineffective and causing activation of retrim cycle start whereby the electrode carriages are caused to move in the opposite direction toward their outermost position. The housing 86 contains switch means 92, shown in FIGURE 9, for stopping the mechanism when the electrodes have reached their outermost limit of movement requiring their replacement by new electrodes.

The switch means 88 in housing 84 is provided with an arm 93 and the switch means 92 in housing 86 is provided with arm 89. Secured to the bracket 76 is a member or block 94 which is movable with the chain 38. The block 94 is disposed to selectively engage or disengage the arms 89 and 93 at the maximum limits of movement of the electrode carriage 56 for operating the switch means 92 and 88. The reflector 14 is provided at each side of the central region 16 with horizontally arranged slots 98 and 99 to accommodate movement of the bars 68, brackets 70 and electrodes 26 and 28.

The means for driving the electrode supporting carriages to move the carriages progressively toward each other to compensate for burning away or consumption of the electrodes comprises a shaded pole reversible motor 116 and high ratio reduction gearing contained within a housing 102. The housing 102, enclosing the reduction gearing, is formed of two mated housing sections 104 and 106. The housing section 104 is provided with laterally extending projections 108 which engage the web portion of the frame member 18. The projections are bored and threaded to accommodate securing screws 110 for securing the housing 102 to the frame member 18.

The housing section 106 is provided with rearwardly extending projections 114 supporting the motor 116 shown in FIGURES 2 and 6 and illustrated schematically in FIGURE 7. The reversible shaded pole motor 116 is inclusive of a core structure 118, a main field winding 120, shading poles 121, 122, 123 and 124, windings for the shading poles designated 126, 127, 128 and 129, and an armature 130, the latter being adapted to rotate in both directions.

The drive gear 54 is mounted upon a shaft 55 journaled in the housing 106 and is driven through the reduction gearing contained within the housing. From FIGURE 7 it will be seen that the shading coils 126 and 128 are in series through a connection 132 and the shading coils 127 and 129 connected in series by a connection 134. The armature 130 of the motor is mounted upon a shaft 136, the shaft 136 carrying the armature 130 driving the reduction or speed reducing gearing within the housing 102.

Rotation of the armature 136, through the medium of the speed reducing gearing in the housing 102 rotates the pinion 54 at a comparatively low speed which drives the gear 52 and sprocket 34 to drive or actuate the chain 38. A selective unbalance in electromotive forces in the pairs of shading coils 126, 128 and 127, 129 render the motor reversible, that is, render the armature rotatable in either direction depending upon a shift of magnetic flux established in the shading poles associated with the shading coils.

The invention is inclusive of a static control system or arrangement responsive to variations in current flow through the electrode circuit or circuit of a current consuming instrumentality. The current control of the invention is influenced by variations in current flow through the arc circuit to cause the motor armature to move in a direction and amount to maintain substantially constant the current flow through the electrodes 26 and 28.

Referring particularly to FIGURE 8, a power transformer 140 is connected with a source of alternating current such as a 110 volt supply through lines or connections L-1 and L-2. The transformer 140 is provided with a primary winding 142, an iron core 144 and a secondary winding 146, the transformer being of a character to produce suitable current in the secondary 146, the latter being connected in series with the electrodes 26 and 28.

The electrode 28 is connected with one terminal of the secondary 146 by a conductor 148 and the other terminal of the secondary winding 146 connected by a conductor 150 with a current coil 152 of the static control arrangement illustrated in FIGURE 11. The current coil 152 is connected with the electrode 26 in series in the circuit conveying current through the electrodes 26 and 28 to establish the arc 30.

The coil 152 surrounds one leg of a closed core structure 156, a second coil 158 surrounding a leg of the core 156 forming a component of the control arrangement in series with the pair of shading coils 126 and 128. A component 160 of the static control arrangement includes coils 162 and 166 surrounding a leg of a closed core structure 164, the coil or winding 166 being in series with the pair of shading coils 127 and 129. One terminal of the coil 162 is connected with the conductor 150, as shown in FIGURE 8, the other terminal of the coil 162 being connected with a variable control element or resistor 168, the movable arm 169 of which is connected with the conductor 148.

It will be apparent that the coil 162 and the resistor 168 are shunted across the secondary 146 of the transformer supplying current to the electrodes 26 and 28. Connected in series with the coil 158 and the shading coils 126 and 128 is a resistor 172. Connected in series with the coil 166 and the shading coils 127 and 129 is a resistor 174. A third resistor 176 forms a common component of both static control circuits.

The resistor 176 completes a circuit through the coil 158, resistor 172 and the shading coils 126 and 128. The resistor 176 completes a circuit through coil 166, resistor 174 and shading coils 127 and 129.

Whenever current flow is established through the primary 142 of the power transformer 140, voltage is established in the coil 162 and resistor 168. Thus voltage is established through coil 162 and resistor 168 even though the electrodes 26 and 28 are spaced apart and there is no current flow through the electrodes.

When current flow is established through the electrodes 26 and 28 in a manner hereinafter explained, current flows through the coil 152, the coil being of capacity sufficient to carry the maximum current flow through the electrodes required to establish an arc of desired intensity. While FIGURE 9 illustrates the various circuits of the lamp and control devices which will be hereinafter described, the schematic circuit of FIGURE 8 illustrates the principle of operation of the static control system or arrangement of the invention.

When current flow is initiated through the shading coil of a pole piece of a unidirectional shaded pole motor, a shifting of the geometric magnetic axis of the pole construction is effected to thereby establish rotating torque on the armature. In the motor 116, a shift of the axis of flux in one set of shading poles by energization of the shading coils associated therewith effects rotation of the armature in one direction, and a shift of the axis of flux in the other set of shading poles through the energization of the shading coils associated therewith effects rotation of the armature 130 in the opposite direction.

When the magnetic flux in both sets of shading poles is equal or in balance, there is no torque reaction tending to rotate the armature 130, that is, there is zero torque. With particular reference to FIGURE 8, and assuming that the electrodes 26 and 28 are spaced apart initially as, for example, when the power transformer is de-energized, there is a cessation of current flow through the electrodes and the arc thus extinguished but the electrodes 26 and 28 remain in spaced relation.

When current flow is again established through the primary 142 of the power transformer 140, current flows through the secondary 146, the coil 162 and the variable control device or resistor 168. Current flow through the coil 162 induces current flow in coil 166 and the circuit through the resistors 174 and 176 and the shading coils 127 and 129. While some current flow is set up in the control circuit including the coil 158, resistor 172 and the shading coils 126 and 128, the electromotive forces set up in the shading coils 127 and 129 is greater than that in the other set of shading coils.

This condition causes a shift of the magnetic flux in one set of shading poles of the motor effecting rotation of the armature 130 in a direction to move the chain 38 to bring the tips of the electrodes 26 and 28 into engaging relation through the movement of the electrode supporting carriages 56 and 57. Upon engagement of the electrodes 26 and 28 current flow is established through the electrodes and the electrode circuit including current flow through the coil 152. The flow of current through coil 152 induces current flow in coil 158 and the circuit involving the shading coils 126 and 128 and resistor 172.

As flow of substantial current ensues through coil 152, the electromotive forces set up in the control circuit embodying coil 158 and shading coils 126 and 128 establishes a shift in the magnetic flux in the pole construction of the motor. The increase in current in the shading coils 126 and 128 by reason of current flow in the electrode circuit reduces the voltage across the coil 162 and resistor 168 and hence reduces the electromotive forces resulting from current flow through shading coils 127 and 129.

This causes the armature 130 of the motor to rotate in the opposite direction to thereby move the electrodes 26 and 28 away from each other through the medium of the movement of chain 38 in the opposite direction. This separating movement of the electrodes establishes the arc 30 and the electrodes continue their separation movement until the electromotive forces in the circuit involving the shading coils 126 and 128 balance the electromotive forces in the shading coils 127 and 129.

When this occurs, the armature of the motor is brought to rest because there is zero torque acting on the rotor due to the balance of the electromotive forces effective on the shading poles and hence restoring equilibrium of the magnetic flux in the shaded pole construction of the motor.

When the electromotive forces in the circuit of the shading coils 126 and 128 become equal to the electromotive forces in the circuit of the shading coils 127 and 129, the armature 130 of the motor ceases rotation, and current flow through the arc and the electrodes continues at a substantially constant rate without any movement of the electrodes until the electrodes burn away or are progressively consumed, effecting a reduction in current flow through the electrode circuit.

When this condition obtains, the electromotive force in the circuit of the shading coils 126 and 128 is reduced and hence the electromotive forces in the shading coils 127 and 129 effect rotation of the armature 130 to move the electrodes 26 and 28 toward each other until the proper current flow or current value through the electrode circuit is reestablished. The variable control device 168, which may be a rheostat, provides means for establishing the level at which the static control device or arrangement of the invention functions or operates to control the arc current or current flow through the electrodes.

It will be apparent that current flow is continuous through both circuits of the pairs of shading coils whenever the transformer 140 is supplied with current and that any deviation or variation in current flow through the electrodes or through the coil 162 and variable control 168 is immediately effective through the static control system or arrangement to establish a differential in electromotive forces between the pairs of shading coils and shift the magnetic flux in the shading poles to effect rotation of the motor armature 130 in a direction to strike the arc or reestablish and maintain substantially constant the current flow through the electrodes.

It will be apparent that this control is of a precision character in that minute variations in the arc current instantly set up a differential in electromotive forces in the circuits of the pairs of shading coils to effect rotation of the motor to reset the electrodes. This precision control is established without any moving components, contacts, relay armatures or the like whereby an effective control is continuously operative without any impairment of the components of the control system or device as the components are of static character.

FIGURE 9 is illustrative of the electrode circuit of the arc lamp and the static control arrangement therefor embodying the principles of the circuit illustrated in FIGURE 8. A master starting switch 180, illustrated in FIGURE 9, is in circuit with a power relay 184. An adjustable exposure timer 188 is in circuit with the power relay and functions to actuate the relay to interrupt current flow in the electrode circuit to extinguish the arc after predetermined "on-time" has expired. The timer is of conventional construction and may be of a mechanically actuated or electrically actuated type.

The power relay 184 is connected with the current supply and the main transformer 140 and functions to control current to the main transformer. A relay 192 is in circuit with the retrimming switch means 88 and 92 and functions to immobilize the static control arrangement comprising the units 155 and 160 in order to permit the initiation of the separation of the electrode carriages 56 and 57, shown in FIGURE 3, when the retrim cycle starting switch 88 is actuated. This switch 88 is actuated by member 94 mounted on the carriage 56 when the electrodes 26 and 28 have been burned away or consumed to their minimum distance of movement.

The starting switch 180 has for its purpose to provide a means to circumvent or over-ride the adjustable exposure timer 188 mimediately after new electrodes 26 and 28 have been inserted in the mounting means supported by the carriages 56 and 57. The starting switch is closed at the beginning of operation of a replacement or new set of electrodes and is not actuated again until the electrodes have been consumed or used up to the minimum length, further movement of the electrodes being prevented by engagement of the block 94 with the trim cycle stop switch 92. It should be noted that the lead 185 from the relay to the transformer 140 is connected to one of a plurality of taps 186 to render variable the primary of the transformer.

The operation of the various control devices of the arc lamp circuit illustrated in FIGURE 9 is as follows: Assuming that fresh or new electrodes 26 and 28 have been mounted in the supports 70 carried by the carriages 56 and 57, and the carriages are at their extreme outermost limits of movement, the retrim cycle stop switch 92 is therefore in closed position having been moved to such position by the block 94 on the carriage 56. The timer 188 may be set for any desired time period that the arc is to be maintained.

As the lamp illustrated is particularly usable for graphic arts work, it is conventional to utilize a timer which may be set to effect establishment of the arc for the length of time desired. The master starting switch 180 is closed and current flow established through coil 162 of the static control device and through the variable control 168.

The current flow through coil 162 sets up induced current in coil 166 and through the circuit of the shading coils 127 and 129, the electromotive forces being greater than the electromotive forces in the shading coils 126 and 128. This condition effects a shifting of magnetic flux in the pole construction causing the armature of the motor 116 to move in a direction to bring the adjacent extremities of the electrodes 26 and 28 into engagement to strike the arc. Engagement of the electrodes sets up current flow through the electrode circuit including the current coil 152 and induced current is established in coil 158 and the shading coils 126 and 128. The electromotive forces thereby established in the shading coils 126 and 128 are of greater magnitude than those in shading coils 127 and 129.

This differential in electromotive forces occurs because of the reduction in current flow through the coil 162 when current flow is established through the electrode circuit to form an arc. This condition causes the opposite set of shading poles of the motor 116 to shift the magnetic flux in the poles of the motor 116 to effect rotation of the armature 130 in the opposite direction to progressively move the electrodes 26 and 28 away from each other until a predetermined arc current value obtains and the electromotive forces in the static control device in the pairs of shading coils become balanced.

The armature 130 then ceases rotation because there is zero torque on the armature when the electromotive forces in the shading pole circuits controlling the magnetic flux are balanced.

The power relay 184, being set into operation by the timer 188, supplies current to the primary of the transformer 140, the secondary of the transformer providing the current flow through the electrode circuit. As the electrodes are burned away or consumed, the gap forming the arc becomes greater and current flow through the electrode circuit reduced.

This reduction of current in the electrode circuit sets up an imbalance condition in the static control device, creating increased electromotive forces in the shading coils 127 and 129 and causing the motor armature 130 to move in the direction to bring the electrodes closer together until the normal arc current flow is reestablished and the electromotive forces in the static control device again restored to a balanced condition.

When the time has lapsed for which the timer has been set, the power relay 184 is de-energized and current flow from the transformer 140 through the electrodes is interrupted. For subsequent establishment of the arc, the timer 188 is reset and the arc reestablished in the manner above described.

With particular reference to FIGURE 8 it will be noted that the resistor 176 is a component common to the static control circuits of the pairs of shading coils. It is to be understood that the circuit of the shading coils 127 and 129 may be independent of the circuit of the shading coils 126 and 128 by substituting a resistance in each circuit in place of the common resistor 176. It is to be understood that the resistors 172, 174 and 176 are for the purpose of establishing the proper balance in the respective shading coil circuits and may be dispensed with or other suitable balancing means used for the purpose.

The static control arrangement of the invention may be utilized for other purposes. FIGURE 10 is illustrative of the use of the static control device of the invention employed in a circuit for charging electric storage batteries. In this circuit the motor 116' is connected mechanically with a relatively movable core 200 of a transformer 202, the transformer including a primary coil 204 and a secondary coil 206. The arrangement illustrated in FIGURE 10 includes a rectifier 210 for providing direct current through the output connections or leads 212 and 214 for charging an electric storage battery 216.

In the control device illustrated in FIGURE 10, the winding 162' is a voltage winding, a variable control resistor 168' being connected between the coil 162' and the lead 148' of the circuit to the rectifier 210. The winding 152' is a current winding connected to the rectifier. The coils 166' and 158' are intercalated in the respective circuits of the pairs of shading coils 127', 129' and 126' and 128'. The shading coil circuits are balanced through the use of the resistors 172', 174', and 176' as in the control arrangement hereinbefore described in connection with the circut diagram illustrated in FIGURE 8.

The primary 204 of the transformer 202 is connected with an alternating current supply designated L–1, L–2. The alternating current supply is connected with the field coil 120' of the motor 116'. The armature 130' of the motor 116' is arranged to effect longitudinal movement of the movable core 200 of the transformer with respect to the windings of the transformer.

The energization of the power transformer 202 causes current to flow through the rectifier circuit, the alternating current through the current winding 152', being representative of the direct current provided by the rectifier for charging the battery 216.

Simultaneously some current will flow through the voltage winding 162'. The resultant action on the static control unit is to sense a high charging current and low voltage so that the armature 130' of the motor 116', through the imbalance in the shading coil circuits, will be rotated in a direction to withdraw the movable iron core to cause the secondary voltage to decrease. Such decrease in voltage will cause a decrease in current flow to a point where the static control arrangement causes the armature 130' of the motor 116' to stop at the desired operating or charging level.

Thereafter as the battery voltage progressively increases because of it being recharged, the charging current will tend to decrease causing the static control unit to sense the change. The armature of the motor will then rotate under the influence of the imbalance in the shading pole circuits in a direction causing the movable iron core 200 to move in the opposite direction, that is, in a direction inserting the core into the windings of the transformer a slight amount thus causing the secondary voltage to increase, this action bringing the charging current up to the predetermined level. This action continues until the charging circuit is de-energized by a switch or timing means (not shown).

From the foregoing description it will be apparent that there is provided a static control system or arrangement which has no moving parts or components, contacts or relays and which will not deteriorate through use because there are no components subject to wear. Furthermore, control of a circuit through current consuming instrumentalities such as the electrodes of an arc lamp will be continuously and accurately maintained at a predetermined current flow. In the use of the arrangement for charging batteries such as the arrangement shown in FIGURE 10, the control will effect a progressive decrease in the current supplied for recharging the battery as the latter approaches a recharged condition.

It is apparent that, within the scope of the invention, modifications and different arrangements may be made other than as herein disclosed, and the present disclosure is illustrative merely, the invention comprehending all variations thereof.

I claim:

1. Control means of the character disclosed for maintaining predetermined current flow in a main circuit which is subject to current variations including, in combination, movable means arranged whereby the relative position of the said means influences current flow in the main circuit, a reversible motor having a movable armature, said movable armature having operative connection with said movable means, said motor embodying shaded pole means for effecting movement of said armature in either direction, control circuit means intercalated with the shaded pole means inductively coupled with the main circuit establishing electromotive forces in said control circuit means, said control circuit means being responsive to current variations in said main circuit establishing varying electromotive forces in the control circuit means effective to move the armature in a direction actuating the movable means to control current flow in the main circuit.

2. Control means of the character disclosed for controlling electromotive forces in a main circuit including, in combination, movable means arranged whereby the relative position of the said means influences electromotive forces in the main circuit, a reversible motor having a movable armature, said movable armature having operative connection with said movable means, said motor embodying shading pole means for effecting relative movement of said armature in either direction, control circuit means for said shading pole means, said control circuit means being responsive to current variations in said main circuit establishing electromotive forces in the shading pole means effective to move the armature in a direction to actuate the movable means for controlling current flow in the main circuit.

3. Control means of the character disclosed for controlling current flow in a main circuit which is subject to current variations including, in combination, movable means associated with the main circuit arranged whereby the relative position of the said means influences current flow in the main circuit, a reversible motor having a rotatable armature, said armature having operative connection with said movable means, said motor embodying shading pole means for effecting rotation of said armature in either direction, control circuit means for said shading pole means, said control circuit means being inductively associated with the main circuit for establishing electromotive forces in said control circuit means, said control circuit means being responsive to current variations in said main circuit for establishing electromotive forces in the shading pole means effective to rotate the armature in a direction to actuate the movable means for establishing and controlling current flow in the main circuit.

4. A control arrangement of the character disclosed for controlling current flow in a main circuit which is subject to current variations, a shunt circuit, movable means associated with the main circuit arranged whereby the relative position of the said means influences current flow in the main circuit, a reversible motor having a rotatable armature, said armature having operative connection with said movable means, said motor embodying shading pole means for effecting rotation of said armature in either direction, a first control circuit inductively coupled with the shunt circuit, a second control circuit inductively coupled with the main circuit, said control circuits being responsive to electromotive forces in said main and shunt circuits for establishing electromotive forces in the shading pole means effective to rotate the armature in a direction to actuate the movable means to control current flow in the main circuit.

5. Control means of the character disclosed, in combination, a reversible motor provided with shading pole means, a main circuit, relatively movable means arranged to be actuated by said motor for controlling current in said main circuit, control circuit means for said shading pole means, said control circuit means being responsive to variations in electromotive forces in the main circuit to influence the shading pole means and thereby effect rotation of the motor to control current flow in said main circuit, and adjustable means operable independently of said control circuit means for predetermining current flow in the main circuit.

6. Control means of the character disclosed, in combination, a reversible motor provided with shading pole means, a main circuit, relatively movable means associated with said main circuit connected with and adapted to be actuated by said motor for varying current flow in said main circuit, a shunt circuit across said main circuit, control circuit means inductively coupled with the main circuit and shunt circuit for influencing said shading pole means, said control circuit means being responsive to variations in electromotive forces in the main and shunt circuits to effect rotation of the motor in a direction to control current flow in said main circuit.

7. Control means of the character disclosed, in combination, a reversible motor provided with shading poles, a main circuit, means actuated by said motor for varying current flow in said main circuit, a current coil in said main circuit, a shunt circuit across said main circuit including a coil, a control circuit including shading coils and a winding inductively coupled with the current coil in said main circuit, a second control circuit including shading coils and a winding inductively coupled with the coil associated with the shunt circuit, means in said control circuits for balancing the electromotive forces in said control circuits, said control circuits being responsive to variations in electromotive forces in said main and shunt circuits to effect rotation of the motor in a direction to maintain predetermined current flow in said main circuit.

8. Control means of the character disclosed, in combination, a reversible shaded pole motor provided with dual shading coil means arranged whereby selective variation in electromotive forces in the dual shading coil means effects rotation of the motor armature, a main circuit subject to current variations, means associated with said main circuit connected with and arranged to be actuated by rotation of the motor armature for varying the current flow in said main circuit, first and second coils associated with the main circuit, a control circuit including one of said shading coil means inductively coupled with said first coil, a second control circuit including another of said shading coil means inductively coupled with the second coil associated with the main circuit, resistance means in said control circuits for balancing the electromotive forces in said control circuits, adjustable means for predetermining current flow through the main circuit, said control circuits being arranged whereby variations in current flow in the main circuit establishes differentials in the electromotive forces in said control circuits to effect rotation of the motor armature in a direction and to an extent to maintain substantially normal the current flow through the main circuit.

9. Control means for an arc lamp having relatively movable electrodes adapted to be adjusted to form an arc, a reversible shaded pole motor for adjusting the electrodes, a current circuit for the electrodes, control circuit means inductively coupled with the electrode circuit for controlling shading pole means of the motor, said control circuit means being responsive to variations in electromotive forces in the electrode circuit to establish electromotive forces in the shading pole means to rotate the motor in a direction to maintain substantially constant the current flow through the electrode circuit, and means operable independently of the control circuit means for predetermining normal current flow in the electrode circuit.

10. Control means for an arc lamp having relatively movable electrodes adapted to be adjusted to form an arc, a reversible shaded pole motor for adjusting the electrodes, a circuit for the electrodes, control circuit means responsive to variations in current flow through the electrode circuit for maintaining the arc substantially constant, said control circuit means being inductively associated with the electrode circuit and connected with shading pole means of the motor to control the direction of rotation of the motor under the influence of current variations in the electrode circuit.

11. Control means for an arc lamp having relatively movable electrode means adapted to be adjusted to form an arc, a reversible shaded pole motor for adjusting the electrode means, a series circuit for the electrodes, a shunt circuit across the electrodes, control means responsive to variations in current flow through the electrode series circuit for maintaining the arc substantially constant, said control means including two normally balanced control circuits, one of said control circuits embodying a coil inductively coupled with a coil in the series circuit, the other control circuit embodying a coil inductively coupled with a coil in the shunt circuit, said control circuits being arranged to control shading pole means effective to cause rotation of the motor to maintain substantially constant current flow through the electrodes.

12. Control means for an arc lamp having relatively movable electrodes adapted to be adjusted to form an arc, a reversible shaded pole motor for adjusting the electrodes, a series circuit for the electrodes, a shunt circuit, control means responsive to variations in current flow through the electrode circuit for maintaining the arc substantially constant, said control means including a pair of magnetic cores, windings on said cores, at least two windings being inductively coupled with coils associated with the series circuit and the shunt circuit, pairs of shading coils for the poles of said motor, one of the windings on a core being connected with one pair of shading coils, another of said windings on a core being connected with another pair of shading coils, and adjustable means for predetermining current flow through the electrode circuit.

13. Control means of the character disclosed for engaging movable electrodes of an arc lamp to form an arc and maintain substantially constant current flow in the electrode circuit after the arc is formed, said control means including a reversible motor having a rotatable armature arranged to vary the relative position of the electrodes, said motor embodying shading coil means for effecting rotation of said armature in either direction, a current coil in said electrode circuit, a shunt circuit for said electrode circuit, a first control circuit including one of said shading coil means inductively coupled with said current coil, a second control circuit including another of said shading coil means inductively coupled with the shunt circuit, said inductive couplings establishing electromotive forces in said control circuits responsive to electromotive forces in the electrode circuit and in the shunt circuit for controlling the direction and extent of rotation of the armature of the motor to engage the electrodes to form the arc and thereafter maintain substantially constant the current flow through the arc.

14. Control means of the character disclosed for engaging movable electrodes of an arc lamp to form an arc and maintain substantially constant current flow in the electrode circuit after the arc is formed, said control means including a reversible pole motor having a rotatable armature arranged to vary the relative position of the electrodes, said motor embodying shading coil means for effecting rotation of said armature in either direction, a current coil in said electrode circuit, a shunt circuit for said electrode circuit, a first control circuit including one of said shading coil means inductively coupled with said current coil, a second control circuit including another of said shading coil means inductively coupled with the shunt circuit, said inductive couplings establishing electromotive forces in said control circuits responsive to electromotive forces in the electrode circuit and in the shunt circuit for controlling the direction and extent of rotation of the armature of the motor to engage the electrodes to form the arc and thereafter maintain substantially constant the current flow through the arc, and adjustable means operable independently of said control circuits for predetermining the amplitude of current flow through the arc.

15. Control means of the character disclosed for engaging movable electrodes of an arc lamp to form an arc and maintain substantially constant current flow in the electrode circuit after the arc is formed, said control means including a reversible shaded pole motor having a rotatable armature arranged to vary the relative position of the electrodes, said motor embodying dual shading coil means for effecting rotation of said armature in either direction, a current coil in said electrode circuit, a shunt circuit across said electrode circuit including a voltage coil, a first control circuit including one of said shading coil means inductively coupled with said current coil, a second control circuit including said other shading coil means inductively coupled with the voltage coil in the shunt circuit, said inductive couplings establishing electromotive forces in said control circuits responsive to electromotive forces in the electrode circuit and in the shunt circuit for controlling the direction and extent of rotation of the armature of the motor to engage the electrodes to form the arc and thereafter maintain substantially constant the current flow through the arc, and variable means associated with the shunt circuit for predetermining the amplitude of current flow through the arc.

References Cited by the Examiner
UNITED STATES PATENTS

| | | | |
|---|---|---|---|
| 1,241,574 | 10/17 | Sykes | 314—69 |
| 2,343,116 | 2/44 | Ryder et al. | 318—208 |
| 3,106,675 | 10/63 | Riebs et al. | 318—208 |

RICHARD M. WOOD, *Primary Examiner.*

JOSEPH V. TRUHE, *Examiner.*